US009324206B2

(12) United States Patent
Saarisalo (10) Patent No.: US 9,324,206 B2
(45) Date of Patent: Apr. 26, 2016

(54) MANAGING INFORMATION RELATING TO SECURE MODULE APPLICATIONS (75) Inventor: Mikko Saarisalo, Kantvik (FI)

(73) Assignee: Nokia Technologies Oy, Espoo (FI)

( * ) Notice: Subject to any disclaimer, the term of this patent is extended or adjusted under 35 U.S.C. 154(b) by 1474 days.

(21) Appl. No.: 12/440,467

(22) PCT Filed: Sep. 7, 2006

(86) PCT No.: PCT/FI2006/050383
§ 371 (c)(1),
(2), (4) Date: Feb. 16, 2011

(87) PCT Pub. No.: WO2008/028989
PCT Pub. Date: Mar. 13, 2008

(65) Prior Publication Data
US 2011/0239304 A1 Sep. 29, 2011

(51) Int. Cl.
G06F 21/57 (2013.01)
G07F 7/08 (2006.01)
G06Q 20/32 (2012.01)
(Continued)

(52) U.S. Cl.
CPC .............. *G07F 7/0826* (2013.01); *G06F 21/57* (2013.01); *G06Q 20/3278* (2013.01); *G06Q 20/341* (2013.01); *G06Q 20/357* (2013.01); *G07F 7/1008* (2013.01); *G07F 7/1016* (2013.01); *H04M 1/72525* (2013.01)

(58) Field of Classification Search
CPC . G06F 15/177; H04L 41/5054; H04W 4/001; G06Q 20/3278

USPC .......................................................... 726/26
See application file for complete search history.

(56) References Cited

U.S. PATENT DOCUMENTS 5,426,762 A 6/1995 Nakagawa
6,557,753 B1 5/2003 Beaujard et al.
(Continued)

FOREIGN PATENT DOCUMENTS

EP 1193986 4/2002
EP 1225744 7/2002
(Continued)

OTHER PUBLICATIONS

Heinonen; Data exchange beteen WAP application and SIM Applicatio toolkit application with technical details; 2000; Retrieved from the Internet <URL: 3gpp.org/ftp/tsg_t/wg3_usim/adhocs/00-old-meetings/10-0009-Winchester/docs/T3z000112.pdf>; pp. 1-10 as printed.*

(Continued)

Primary Examiner — Zachary A Davis
(74) Attorney, Agent, or Firm — Locke Lord LLP (57) ABSTRACT An apparatus capable of hosting a secure module, which secure module comprises at least one secure module application. The apparatus is configured to provide connectivity to the secure module. A processing module is configured to obtain from the secure module information concerning the at least one secure module application. The processing module is, based on the obtained information, configured to check whether a compatible counterpart application is present in the apparatus. A communication module is configured to obtain the compatible counterpart application from an outside source in case no compatible counterpart application is present in the apparatus.

24 Claims, 5 Drawing Sheets (51) Int. Cl.
*G06Q 20/34* (2012.01)
*G07F 7/10* (2006.01)
*H04M 1/725* (2006.01)

(56) References Cited

U.S. PATENT DOCUMENTS

| | | | |
|---|---|---|---|
| 6,571,389 B1* | 5/2003 | Spyker et al. | 717/176 |
| 6,883,718 B1* | 4/2005 | Le et al. | 235/492 |
| 7,165,109 B2* | 1/2007 | Chiloyan et al. | 709/227 |
| 7,890,427 B1* | 2/2011 | Rao et al. | 705/51 |
| 7,913,246 B2* | 3/2011 | Hammond et al. | 717/173 |
| 2001/0042049 A1 | 11/2001 | Zucker et al. | |
| 2001/0056462 A1 | 12/2001 | Kataoka | |
| 2002/0083228 A1 | 6/2002 | Chiloyan et al. | |
| 2004/0181416 A1 | 9/2004 | Lee et al. | |
| 2005/0222961 A1* | 10/2005 | Staib et al. | 705/64 |
| 2006/0080351 A1 | 4/2006 | Powell et al. | |
| 2006/0229027 A1* | 10/2006 | Wang et al. | 455/73 |
| 2006/0237528 A1* | 10/2006 | Bishop et al. | 235/380 |
| 2009/0098825 A1 | 4/2009 | Huomo et al. | |
| 2009/0124251 A1* | 5/2009 | Niccolini | 455/425 |
| 2010/0257614 A1 | 10/2010 | Ginter et al. | |

FOREIGN PATENT DOCUMENTS

| | | | |
|---|---|---|---|
| EP | 1303153 A1 | 4/2003 | |
| EP | 1455499 | 9/2004 | |
| EP | 1462938 | 9/2004 | |
| EP | 1551193 A1 | 7/2005 | |
| GB | 2292047 A | 2/1996 | |
| JP | 2001195238 | 7/2001 | |
| JP | 2002111888 | 4/2002 | |
| JP | 2002268983 | 9/2002 | |
| JP | 2004297813 | 10/2004 | |
| JP | 2006072956 | 3/2006 | |
| JP | 2006-154997 | 6/2006 | |
| JP | 2006519524 | 8/2006 | |
| WO | 9925141 A1 | 5/1999 | |
| WO | 2006040115 A1 | 4/2006 | |
| WO | WO2006053835 | 5/2006 | |
| WO | 2006120280 A1 | 11/2006 | |
| WO | 2008028989 A | 3/2008 | |

OTHER PUBLICATIONS

No stated author; JSR-118, Mobile Information Device Profile v. 2.0; 2002; Retrieved from the Internet <URL: download.oracle.com/otndocs/jcp/7010-midp-2.0-pfd-spec-oth-JSpec/>; pp. 1-50 as printed.*
No stated author; JSR-177, Security and Trust Services API (SATSA); 2004; Retrieved from the Internet <URL: download.oracle.com/otndocs/jcp/j2me_satsa-1.0-fr-spec-oth-JSpec/>; pp. 1-77 as printed.*
No stated author; Alliance, Mobile Payments at the Physical Point-of-Sale: Assessing U.S. Market Drivers and Industry Direction; Apr. 2005; Retrieved from the Internet <URL: sca-la.org/secure/reports/Mobile_Payments_Physical_POS.pdf>; pp. 1-52.*
International Search Report of the International Searching Authority for corresponding International Patent Cooperation Treaty Application PCT/FI2006/050383, dated May 31, 2007, 4 pages.
Written Opinion of the International Searching Authority for corresponding International Patent Cooperation Treaty Application PCT/FI2006/050383, dated May 31, 2007, 6 pages.
Supplemental European Search Report for corresponding European Application No. 06778566, dated Jun. 4, 2010, 2 pages.
Search Opinion for European Search Report for corresponding European Application No. 06778566, dated Jun. 4, 2010, 2 pages.
JSR 118 Expert Group, Java Community Process, 'Mobile Information Device Profile for JavaTM 2 Micro Edition', Sunmicrosystems, Inc. and Motorola, Inc., Nov. 5, 2002.
Ahonen P., et al., Information Security Threats and Solutions in the Mobile World, the Service Developer's Perspective. VTT Tiedotteita—Research Notes 2308, Helsinki 2005.
Debbabi, M., et al., Java for Mobile Devices: A Security Study, Computer Security Applications Conference, 21st Annual Tucson, AZ USA Dec. 5-9, 2005, Piscataway, NJ, USA, IEEE.
"International Search Report and the Written Opinion of the International Searching Authority", received in corresponding PCT Application No. PCT/FI2007/050052, Dated Oct. 12, 2007, 11 pages.
White, R., "How Computers Work", Millennium Ed., Que Corporation, Indianapolis, IN, 1999.
English Language Machine Translation of Japanese Patent Application Publication No. JP2004297813, 18 pages.
English Language Machine Translation of Japanese Patent Application Publication No. JP2006072956, 32 pages.
English Language Machine Translation of Japanese Patent Publication No. JP2006-154997—26 pages.

* cited by examiner

| SE appln. ID | UI appln. name / ID | UI appln. version | UI appln. site / URL |
|---|---|---|---|
| #### ## # | #### ## # | #### ## # | #### ## # |
| #### ## # | #### ## # | #### ## # | #### ## # |
| #### ## # | #### ## # | #### ## # | #### ## # |

MANAGING INFORMATION RELATING TO SECURE MODULE APPLICATIONS

RELATED APPLICATION

This application was originally filed as PCT Application No. PCT/FI2006/050383 filed Sep. 7, 2006.

FIELD OF THE INVENTION

The present invention relates to managing information relating to secure element or secure module applications.

BACKGROUND OF THE INVENTION

Traditionally, payment and/or ticketing applications have been residing on a secure chip embedded onto a credit card size plastic smartcard.

More recently, when contactless payment/ticketing have become more common, one has begun to install secure chips containing payment instruments and/or public transportation tickets into mobile phones. In one implementation a mobile device comprises a smartcard module and a near field communication module, which may be a radio frequency identification (RFID) module. The smartcard module is a secure element which contains the required secure element application, e.g. the payment/ticketing application. The secure element application may be started by a user or automatically based on the context and/or location of the mobile device. For example, if the mobile device is located in the area of a point of sales terminal, the secure element application can automatically start. The near field communication module will be activated and subsequently a contactless payment transaction can be carried out.

Now that secure elements containing secure element applications are installed into mobile phones this enables a convenient feature, namely a possibility to enable a user interface for providing user of the phone with means to observe and control various applications stored in the secure element. The user interface of the mobile device can be used as a user interface for the secure element. Typically, this requires two applications: a first application (the secure element application) installed in the secure element to provide the security critical functionality, and a second application (user interface application) installed into the mobile phone to provide the user interface and to control the first application in case appropriate security level is provided. Having two distinct applications to provide the total functionality introduces a risk of those two getting out of sync thereby destroying proper operation.

In other words, whenever a situation arises in which the mobile device for some reason does not have the required counterpart application (user interface application) the user interface functionality will be disabled. This may occur, e.g., when the secure element is changed from one mobile device to another (if the latter does not contain the required application) or when the software of the phone is being updated.

SUMMARY

According to a first aspect of the invention there is provided an apparatus capable of hosting a secure module, which secure module comprises at least one secure module application, wherein the apparatus is configured to provide connectivity to the secure module, the apparatus comprising:

a processing module configured to obtain from the secure module information concerning the at least one secure module application, wherein the processing module is, based on the obtained information, further configured to check whether a compatible counterpart application is present in the apparatus, and a communication module coupled with the processing module configured to obtain the compatible counterpart application from an outside source in case no compatible counterpart application is present in the apparatus.

In an embodiment the counterpart application is a compatible application residing in the (hosting) apparatus outside the secure module. In an embodiment, the counterpart application is an application which is designed to operate together with the secure element application. In an embodiment the counterpart application is an application providing a user interface for the secure module in a mobile station. In an embodiment the counterpart application is a control application controlling the operation of the secure module from outside. In another embodiment the counterpart application is another application managing the secure module.

According to a second aspect of the invention there is provided an apparatus comprising:

a secure module, which secure module comprises at least one secure module application, the apparatus further comprising:

a processing module configured to obtain from the secure module information concerning the at least one secure module application, wherein the processing module is, based on the obtained information, further configured to check whether a compatible counterpart application is present in the apparatus, and a communication module coupled with the processing module configured to obtain the compatible counterpart application from an outside source in case no compatible counterpart application is present in the apparatus.

In an embodiment a hosting apparatus, such as a mobile terminal, accesses via an interface information in the secure module. In an embodiment, the accessed information comprises instructions on how to fetch control or user interface software from one or more remote sources to the terminal. In cases where the mobile terminal does not have this software already installed, the software can be fetched. With the aid of the fetched software a user of the terminal can then access and manage various secure module applications stored in the secure module.

According to a third aspect of the invention there is provided a secure module comprising:

a processing element for installing at least one secure module application into the secure module, and a memory coupled with the processing element for storing into the secure module information identifying, concerning the secure module application, a compatible counterpart application.

In an embodiment the secure module maintains in the secure module, which may be a physical integrated circuit (due to application specific security reasons), a dedicated registry or database, which contains appropriate data for managing application(s) stored into the secure element with the aid of a mobile terminal's user interface.

According to a fourth aspect of the invention there is provided a method for an apparatus capable of hosting a secure module, which secure module comprises at least one secure module application, the method comprising:

obtaining from the secure module information concerning the at least one secure module application;

checking, based on the obtained information, whether a compatible counterpart application is present in the apparatus, and obtaining the compatible counterpart application from an outside source in case no compatible counterpart application is present in the apparatus.

In an embodiment a secure module application registry is implemented into the secure module. In an embodiment the registry contains an entry for each secure module application stored in the secure module. An entry may contain various information, such as name, vendor and re-installation/update instructions for a mobile terminal's counterpart application, e.g., user interface or control application. In an embodiment, the registry may also contain other information relating to the installation or engagement of user interface/control applications. In case the software corresponding to the secure module application is lost in a mobile terminal or a need for a user interface/control application update occurs for some reason or the other, the mobile terminal software can consult this registry in order to maintain and help keeping the terminal user interface application in sync with the stored application(s) in the secure module.

According to a fifth aspect of the invention there is provided a method of managing a secure module, the method comprising:

installing at least one secure module application into the secure module, and storing in the secure module information identifying a compatible counterpart application concerning the at least one secure module application.

In an embodiment, the secure module is a secure smartcard chip which is in direct communication contact with a near field communication module or RFID communication module of the hosting apparatus enabling the use of secure module applications, such as contactless payment/ticketing applications.

According to a sixth aspect of the invention there is provided computer program stored in a computer readable medium, the computer program comprising computer executable program code adapted to cause an apparatus to perform the method in accordance with the fourth aspect.

According to an seventh aspect of the invention there is provided a computer program stored in a computer readable medium, the computer program comprising computer executable program code adapted to cause a secure module to perform the method in accordance with the fifth aspect.

According to a eighth aspect of the invention there is provided an apparatus capable of hosting a secure module, which secure module comprises at least one secure module application, wherein the apparatus comprises:

means for providing connectivity to the secure module;

means for obtaining from the secure module information concerning the at least one secure module application, wherein the apparatus comprises:

means for checking, based on the obtained information, whether a compatible counterpart application is present in the apparatus, and means for obtaining the compatible counterpart application from an outside source in case no compatible counterpart application is present in the apparatus.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which.

DETAILED SPECIFICATION

Figure 1:
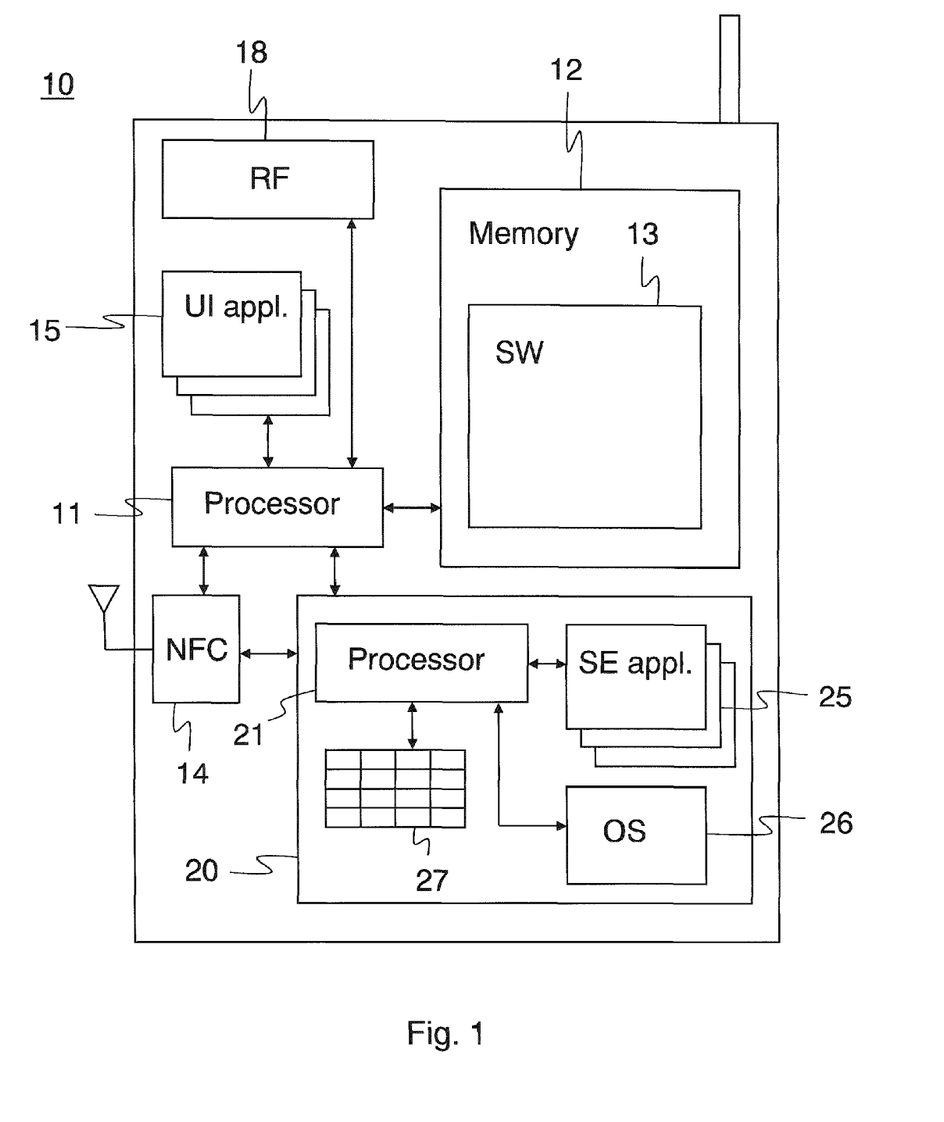
FIG. 1 shows an apparatus according to an embodiment of the invention.

FIG. 1 shows an apparatus according to an embodiment of the invention. The apparatus 10 comprises a processor 11, memory 12, and software 13 which is stored into the memory 12. The software 13 comprises program code containing instructions which the processor 11 executes in order to control the operation of the apparatus 10. In an embodiment, the apparatus 10 is a mobile terminal or mobile phone.

The apparatus 10 further comprises a secure module or element 20 which comprises a processor 21, an operating system 26 and one or more secure element applications 25. In an embodiment, the secure element 20 is a smart card or chip permanently integrated, detachably attached or removably mounted into the apparatus 10. In an embodiment, the apparatus comprises a smart card slot in which the secure element 20 can be fed. In an embodiment, the secure element 20 is a subscriber identity module (SIM). Normally, the secure element 20 should be tamper-resistant.

The apparatus 10 is provided with connectivity to the secure element 20. In practice, the apparatus 10 can include a smart card interface or interface module (not shown) which is in contact with secure element's physical pin connectors. The interface can be coupled to the processor 11 via a databus (not shown). The secure element 20 can define different security levels for different information contained in the secure element 20. The apparatus 10 can request information via the interface from the secure element 20. Depending on what is the security level of the requested information, the secure element 20 delivers the requested information to the apparatus 10. For this purpose, the secure element 20 may comprise, for example, a security checking module or similar (not shown). This module may be implemented by software or a suitable combination of software and hardware. It classifies different information in different security levels and checks whether a requester (for example, the apparatus 10 or apparatus software 13) has appropriate rights to receive requested information from the secure module 20.

The secure element application 25 may be, for example, a payment application or a ticketing application. The application 25 is run by the secure element processor 21. If the operating system 26 of the secure element 20 is Java the secure element application 25 may be called an applet. The secure element 20 provides an interface for accessing the (typically passive) secure element from outside. This interface may be provided by software or by suitable arrangements using software and/or hardware and/or physical arrangements, such as pin connectors.

The apparatus 10 further comprises a near field communication module 14 with an antenna. The near field communication module 14 is connected to the processor 11 and to the secure element 20. In an embodiment, the near field communication module 14 is an RFID communication module, such as, for example an RFID reader with means to operate also in a tag mode. An external device, such as a point-of-sale terminal or a contactless reader (not shown in FIG. 1), may communicate with the secure element 20 via the near field communication module 14.

The apparatus 10 further comprises user interface applications 15 which are run by the processor 11. These may be called midlets. There should be a user interface application 15 for each secure element application 25. The user interface application 15 implements a user interface for the corresponding secure element application 25. In that way a keyboard and display of the apparatus 10 can be used as a user interface for the secure element application 25.

The secure element 20 has a registry table or database 27. The table 27 can be implemented as a separate application into the secure element chip. Alternatively, the functionality can be implemented into the secure element operating system 26. In this table is maintained information on installed secure element applications 25 and the counterpart user interface applications 15. For each secure element application 25 this table contains information identifying the counterpart application 15 which is required to be present in the apparatus 10. This information can be presented in various ways. For example, this information may comprise the name (or some other identifier) and version number of the required counterpart application 15. In an alternative embodiment the table 27 contains information of both the name and the vendor. In an alternative embodiment the table 27 contains instructions on how to install/update the required counterpart application 15. If the apparatus does not have the required counterpart application 15 or the required version of the application, an installation or update can be performed by following the instructions. Said instructions may comprise for example the address of a network resource from which the application or update can be downloaded. This address may be in the form of an URL (Uniform Resource Locator).

Figure 2:
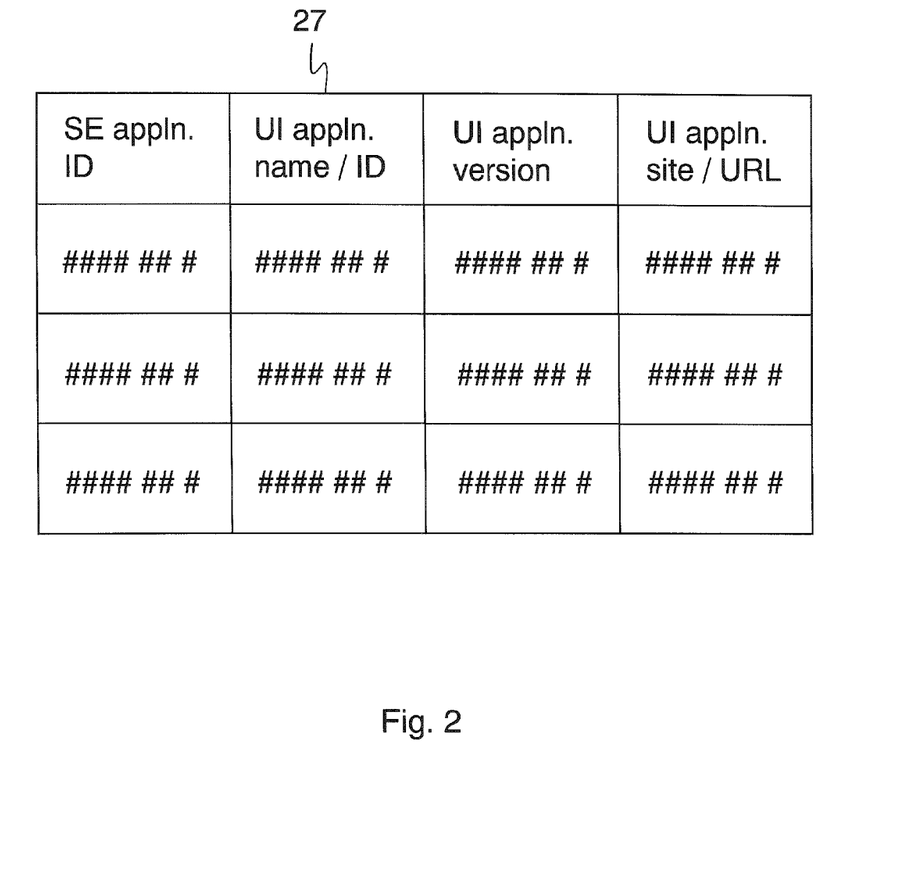
FIG. 2 illustrates a registry table according to an embodiment of the invention.

FIG. 2 illustrates an embodiment of the table 27. In this embodiment, the table contains for each secure element application 25 (identified for example by an application and version identifier) information identifying the exact counterpart application 15 (name and version), and the network site from which this application or update can be downloaded.

Figure 3:
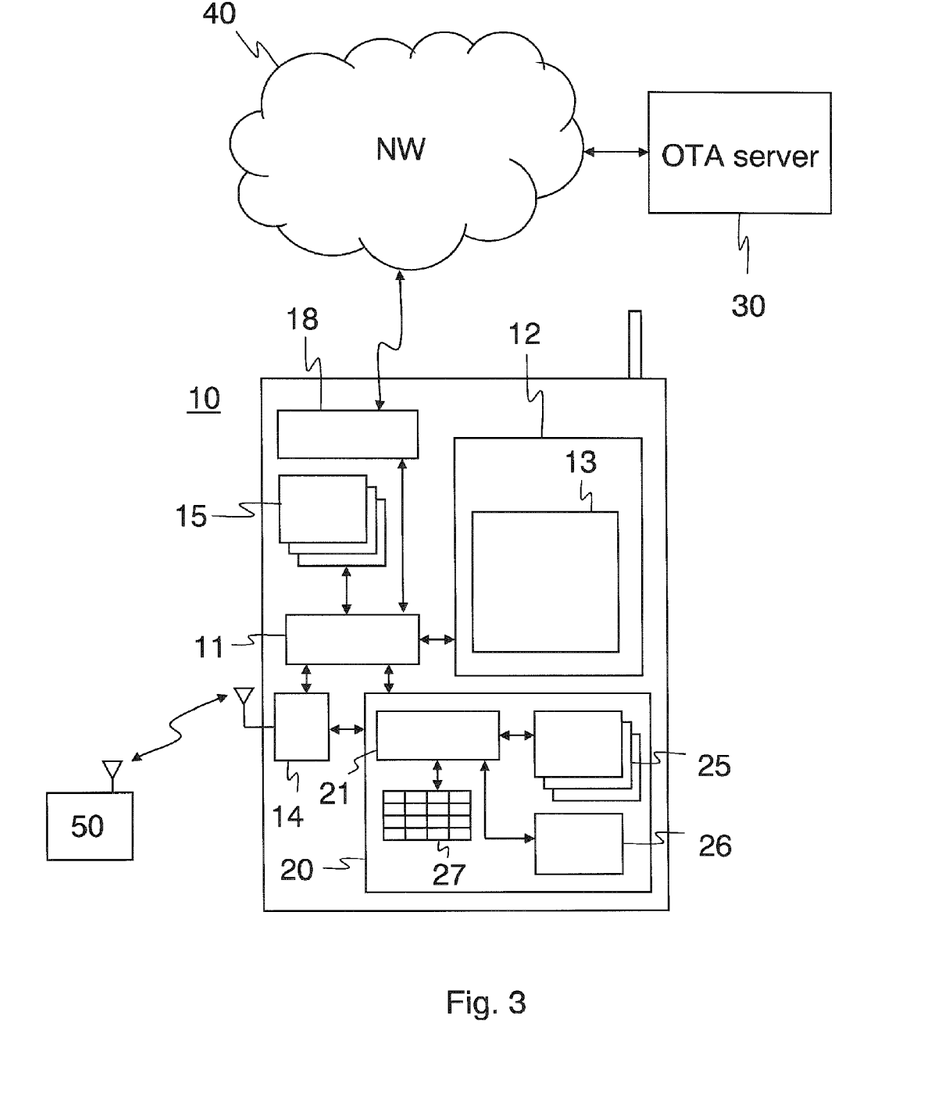
FIG. 3 shows different routes of installing and/or updating applications in an apparatus according to an embodiment of the invention.

FIG. 3 shows different routes of installing and/or updating applications in an apparatus according to an embodiment of the invention. According to one alternative, a secure element application or application update is installed via a contactless method using a near field communication link. The application and/or installation file is transferred from a contactless reader 50 over the near field communication link to the near field communication module 14 and therefrom to the secure element 20 in which the installation is carried out. According to another alternative, the secure element application or application update is installed via on-the-air (OTA) installation method. In this alternative, the application and/or installation file is transferred from an on-the-air server 30 via communications network 40 to the apparatus 10 using a cellular network connection-oriented or connectionless communications service. For this purpose, the apparatus comprises a cellular radio transceiver 18 coupled to the processor 11.

Figure 4:
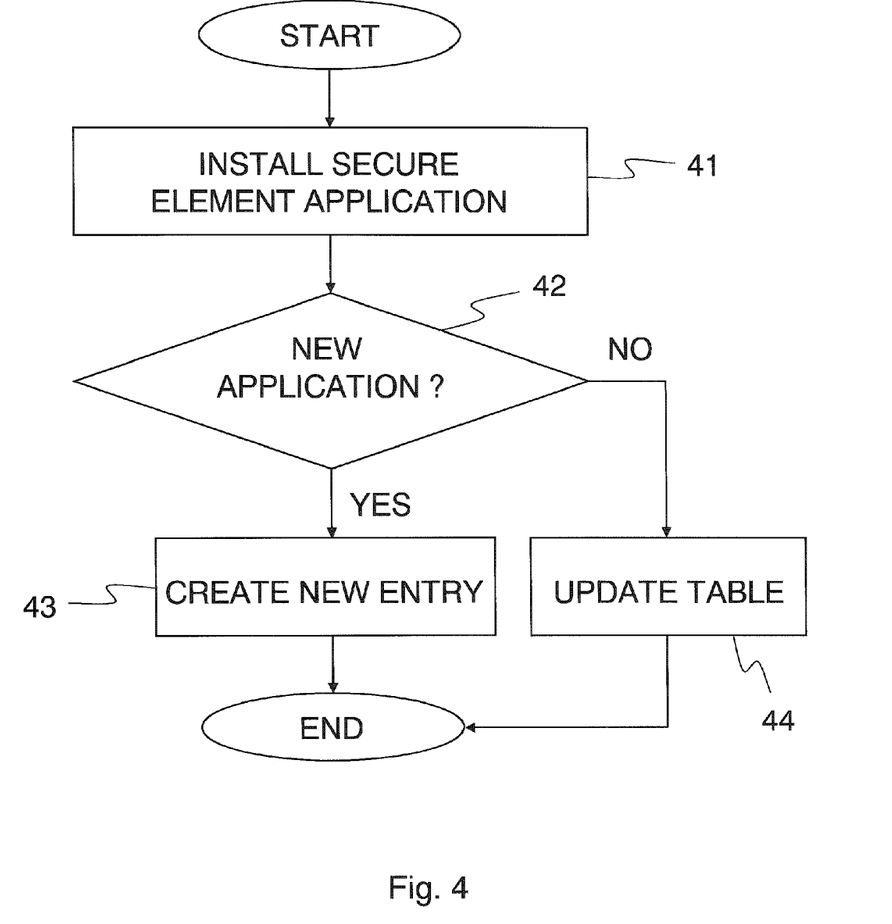
FIG. 4 shows a flow chart in accordance with an embodiment of the invention.

FIG. 4 shows a flow chart illustrating the installation process of a secure element application or application update. Upon receipt of the application or installation file, the secure element processor 21 installs the secure element application or application update in the memory (not shown for reasons of clarity) of the secure element 20 (step 41). If a new application is installed, an entry is created into the table 27 (step 42). As presented earlier the entry contains, for example, information identifying the exact counterpart application 15 as well as instructions about where to obtain it (step 43). If the installation is an update of an existing secure element application 25, the corresponding section in the table is updated accordingly, if needed (step 44). A table update may be needed, for example, if the updated secure element application 25 requires an update in the counterpart application 15.

Figure 5:
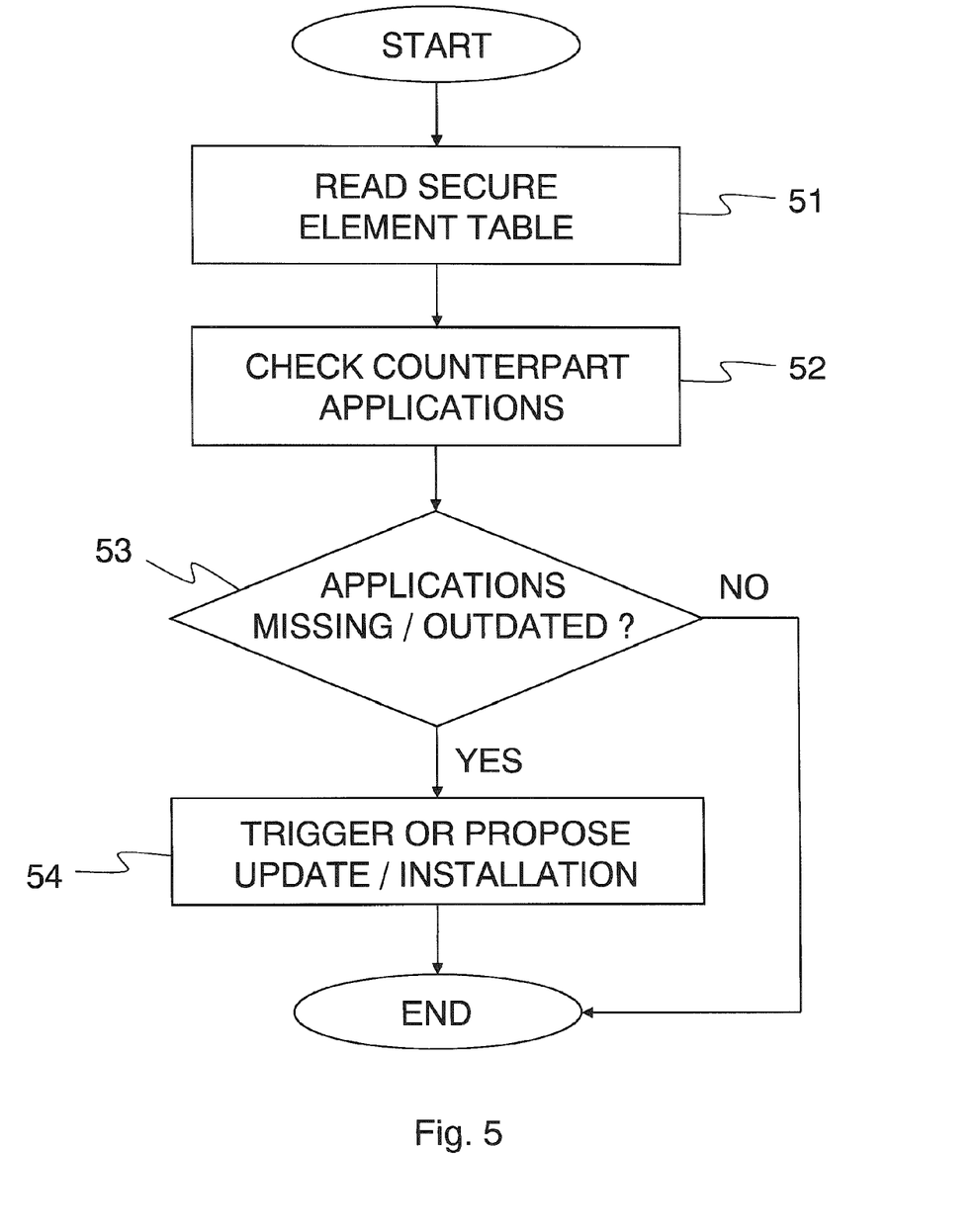
FIG. 5 shows a flow chart in accordance with another embodiment of the invention.

FIG. 5 shows a flow chart illustrating a process which helps in keeping the secure element application 25 and the counter application 15 in sync in accordance with an embodiment. This process can be carried out in specific situations; for example when turning on the apparatus or immediately after updating the apparatus software (the actual apparatus software or secure element software). In step 51 the processor 11 under control of apparatus software 13 reads the secure element table 27, and in step 52 it check the counterpart applications 15 installed in the apparatus 10. The apparatus knows which applications are present in the apparatus. This information may be kept in the apparatus memory 12, for example, in a register or database or similar (not shown). The processor 11 consults this information source in step 52. If it is detected, based on a comparison performed in step 53, that one or more counterpart applications are missing or have, e.g., the wrong version, an update or installation is triggered or suggested (step 54). The apparatus software 13 can trigger the update or installation so that it is performed automatically without user interference, for example, by on-the-air installation via the cellular radio transceiver 18. Alternatively, the apparatus software 13 can ask from the user whether he/she desires that the update or installation is downloaded. The apparatus software can suggest the update or installation to the user by a pop-up window or similar and proceed in accordance with user response.

Various embodiments of the invention have been presented. Although the term user interface application has been widely used, it is clear that the counterpart application is not restricted to user interface applications, but other counterpart applications, such as control or managing applications are applicable as well.

It should be appreciated that in this document, words comprise, include and contain are each used as open-ended expressions with no intended exclusivity.

The foregoing description has provided by way of non-limiting examples of particular implementations and embodiments of the invention a full and informative description of the best method and apparatus presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention could be used to advantage without the corresponding use of other features. As such, the foregoing description should be considered as merely illustrative of the principles of the present invention, and not in limitation thereof. Hence, the scope of the invention is only restricted by the appended patent claims.

What is claimed is:

1. An apparatus, comprising:
   a secure module hosted by the apparatus, the secure module comprising a processor, an operating system and at least one secure module application residing in the secure module, wherein the secure module is configured to provide a secure environment for the at least one secure module application, and wherein the secure module application comprises one of a payment application and a ticketing application for conducting a payment transaction or a ticketing transaction, respectively;

a near field communication module configured to provide an interface for the hosted secure module to communicate with an external source;
at least one processor;
at least one memory including computer program code;
the at least one memory and the computer program code configured to, with the at least one processor, cause the apparatus at least to:
  obtain from the secure module, information identifying the at least one secure module application; and
  check whether a compatible counterpart application to the identified at least one secure module application is present in the apparatus outside the secure module based on the obtained information;
a user interface component for providing connectivity from the apparatus to the secure module;
and
a communication module coupled with the at least one processor, configured to obtain the compatible counterpart application from an outside source in case no compatible counterpart application is present in the apparatus,
wherein said counterpart application is configured to provide a user interface for at least one of the secure module and the at least one secure module application via the user interface component, and
wherein the secure module includes a registry configured to correlate secure module applications with compatible counterpart applications and to include instructions on where to obtain the compatible counterpart applications.

2. The apparatus according to claim 1, wherein the at least one processor is configured to send a command to the communication module to obtain the counterpart application.

3. The apparatus according to claim 1, wherein said information comprises a name or name identifier, and version identifier of the compatible counterpart application.

4. The apparatus according to claim 1, wherein said information comprises instructions on how to install or update the compatible counterpart application.

5. The apparatus according to claim 1, wherein said information indicates a network resource from which the compatible counterpart application or an update can be downloaded.

6. The apparatus according to claim 1, wherein the near field communication module is configured to communicate information between an outside contactless reader and the hosted secure module.

7. The apparatus according to claim 1, wherein the at least one secure module application is configured to implement at least one of a payment and a ticketing application to enable the apparatus to conduct a contactless transaction with an external source.

8. The apparatus according to claim 1, wherein the counterpart application is configured to provide a user interface at the apparatus for the secure module application.

9. An apparatus comprising:
a secure module hosted by the apparatus, the secure module comprising a processor, an operating system and at least one secure module application residing in the secure module, wherein the secure module is configured to provide a secure environment for the at least one secure module application, and wherein the secure module application comprises one of a payment application and a ticketing application for conducting a payment transaction or a ticketing transaction, respectively;
at least one processor;
at least one memory including computer program code;
the at least one memory and the computer program code configured to, with the at least one processor, cause the apparatus at least to:
  obtain from the secure module information identifying the at least one secure module application; and
  check whether a compatible counterpart application to the identified at least one secure module application is present in the apparatus outside the secure module based on the obtained information;
a user interface component for providing connectivity from the apparatus to the secure module;
and
a communication module coupled with the at least one processor, configured to obtain the compatible counterpart application from an outside source in case no compatible counterpart application is present in the apparatus,
wherein said counterpart application is configured to provide a user interface for at least one of the secure module and the at least one secure module application via the user interface component, and
wherein the secure module includes a registry configured to correlate secure module applications with compatible counterpart applications and to include instructions on where to obtain the compatible counterpart applications.

10. The apparatus according to claim 9, further comprising a near field communication module, wherein the near field communication module is configured to communicate information between an outside contactless reader and the hosted secure module.

11. The apparatus according to claim 9, wherein the at least one secure module application is configured to implement at least one of a payment and a ticketing application to enable the apparatus to conduct a contactless transaction with an external source.

12. The apparatus according to claim 9, wherein the counterpart application is configured to provide a user interface at the apparatus for the secure module application.

13. A method, comprising:
obtaining, by an apparatus, from a secure module hosted by the apparatus, information identifying at least one secure module application residing in the secure module, wherein the secure module application comprises one of a payment application and a ticketing application for conducting a payment transaction or a ticketing transaction, respectively;
checking, by the apparatus, based on the obtained information, whether a compatible counterpart application to the identified at least one secure module application is present in the apparatus outside the secure module, and
obtaining, by the apparatus, the compatible counterpart application from an outside source in case no compatible counterpart application is present in the apparatus,
wherein the apparatus comprises at least one processor and at least one memory,
wherein the secure module comprises the at least one secure module application, an operating system and a processor different than the at least one processor of the apparatus,
wherein the secure module is configured to provide a secure environment for the at least one secure module application,
wherein said counterpart application is configured to provide a user interface for at least one of the secure module and the at least one secure module application, and
wherein the secure module includes a registry configured to correlate secure module applications with compatible counterpart applications and to include instructions on where to obtain the compatible counterpart applications.

14. The method according to claim 13, wherein said information comprises a name or name identifier, and version identifier of the compatible counterpart application.

15. The method according to claim 13, wherein said information comprises instructions on how to install or update the required compatible counterpart application.

16. The method according to claim 13, wherein said information indicates a network resource from which the compatible counterpart application or update can be downloaded.

17. The method according to claim 13, wherein the at least one secure module application is configured to implement at least one of a payment and a ticketing application to enable the apparatus to conduct a contactless transaction with an external source.

18. The method according to claim 13, wherein the counterpart application is configured to provide a user interface at the apparatus for the secure module application.

19. A computer program comprising computer executable program code stored in a non-transitory computer readable medium, which when executed by at least one processor of an apparatus, causes the apparatus to:
obtain from a secure module hosted by the apparatus information identifying at least one secure module application residing in the secure module, wherein the secure module application comprises one of a payment application and a ticketing application for conducting a payment transaction or a ticketing transaction, respectively;
check, based on the obtained information, whether a compatible counterpart application to the identified at least one secure module application is present in the apparatus outside the secure module, and
obtain the compatible counterpart application from an outside source in case no compatible counterpart application is present in the apparatus,
wherein the secure module comprises the at least one secure module application, an operating system and a processor different than the at least one processor of the apparatus,
wherein the secure module is configured to provide a secure environment for the at least one secure module application,
wherein said counterpart application is configured to provide a user interface for at least one of the secure module and the at least one secure module application, and
wherein the secure module includes a registry configured to correlate secure module applications with compatible counterpart applications and to include instructions on where to obtain the compatible counterpart applications.

20. A secure module comprising:
at least one processor;
at least one memory including computer program code;
the at least one memory and the computer program code configured to, with the at least one processor, cause the secure module at least to:
install at least one secure module application into the secure module, wherein the at least one secure module application is configured to implement one of a payment and a ticketing application to enable an apparatus hosting the secure module to conduct a contactless payment or ticketing transaction, respectively, with an external source and the secure module is further configured to transmit to the apparatus information identifying the at least one secure module application; and
store into the secure module information identifying a compatible counterpart application to the identified at least one secure module application, wherein the counterpart application is configured to provide a user interface at the apparatus for the at least one of the secure module and the secure module application,
wherein the apparatus comprises a processor and a memory different than the at least one processor and the at least one memory of the secure module and the apparatus is configured to execute the counterpart application outside the secure module,
wherein the secure module is configured to provide a secure environment for the at least one secure module application, and
wherein the secure module includes a registry configured to correlate secure module applications with compatible counterpart applications and to include instructions on where to obtain the compatible counterpart applications.

21. The secure module according to claim 20, wherein the secure module comprises an interface for accessing the secure module from a hosting apparatus.

22. The secure module according to claim 20, wherein the secure module comprises a security checking module for checking that a requester has appropriate rights to receive requested information from the secure module.

23. The secure module according to claim 20, wherein the secure module is a smart card.

24. A computer program comprising computer executable program code stored in a non-transitory computer readable medium, which when executed by at least one processor of a secure module causes the secure module to:
install at least one secure module application into the secure module, wherein the at least one secure module application is configured to implement at least one of a payment and a ticketing application to enable an apparatus hosting the secure module to conduct a contactless payment or ticketing transaction, respectively, with an external source;
store in the secure module information identifying a compatible counterpart application concerning the at least one secure module application, wherein the counterpart application is configured to provide a user interface at the apparatus for at least one of the secure module and the secure module application; and
transmit to the apparatus information identifying the at least one secure module application,
wherein the apparatus comprises a processor different than the at least one processor of the secure module and the apparatus is configured to execute the counterpart application outside the secure module,
wherein the secure module is configured to provide a secure environment for the at least one secure module application, and
wherein the secure module includes a registry configured to correlate secure module applications with compatible counterpart applications and to include instructions on where to obtain the compatible counterpart applications.

* * * * *